C. H. SCHROEDER.
SEED SPROUTER.
APPLICATION FILED JUNE 2, 1917.

1,251,826.

Patented Jan. 1, 1918.

Witness:
R. J. Hamlin

Inventor:
Carl H. Schroeder
by Orwig & Bain
Attorneys.

UNITED STATES PATENT OFFICE.

CARL H. SCHROEDER, OF DES MOINES, IOWA.

SEED-SPROUTER.

1,251,826.  Specification of Letters Patent.  Patented Jan. 1, 1918.

Application filed June 2, 1917. Serial No. 172,536.

*To all whom it may concern:*

Be it known that I, CARL H. SCHROEDER, a citizen of the United States, and resident of Des Moines, in the county of Polk and State of Iowa, have invented a certain new and useful Seed-Sprouter, of which the following is a specification.

The object of my invention is to provide a seed sprouter of simple, durable and inexpensive construction.

More particularly it is my object to provide a seed sprouter comprising a frame adapted to support a plurality of containers or pans, preferably arranged in tiers, and to provide smaller trays in each pan, the trays being perforated; and further to provide means for raising and lowering said trays in the pan for raising or lowering the trays from or into water in the pans, which means is adapted to be readily and easily controlled from outside the containers.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 2:
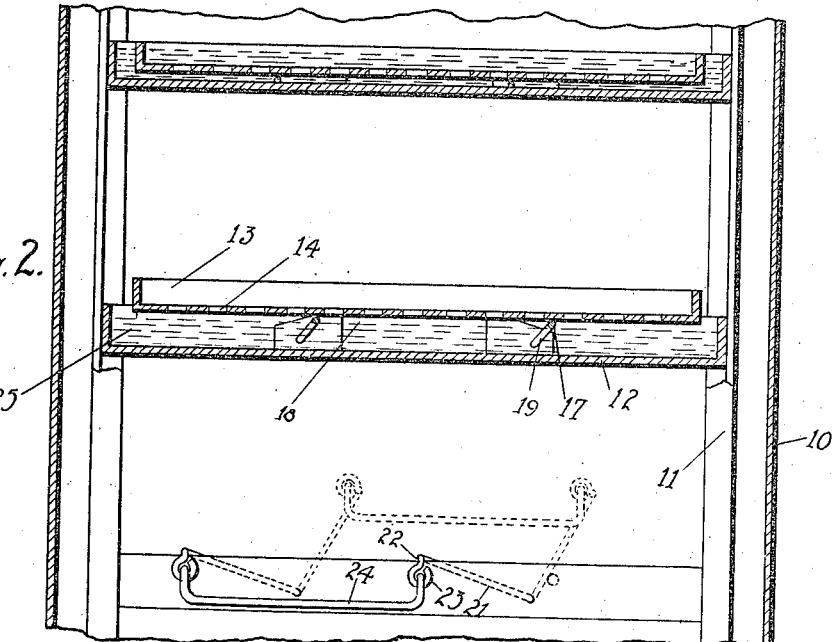
Fig. 2 shows a vertical, sectional view through the same, the seed sprouting device being shown in its lower portion in side elevation and in its upper portion in vertical section.
Figure 1:
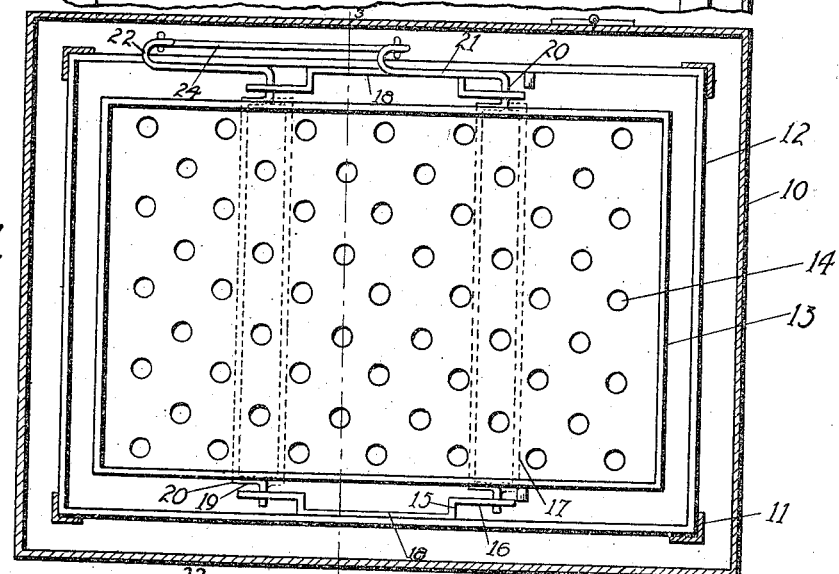
Figure 1 shows a horizontal, sectional view through a large tank or the like, holding my improved seed sprouter.

In the accompanying drawings, I have used the reference numeral 10 to indicate generally a large tank or the like which may be used for receiving my seed sprouter, where it is desired to maintain a substantially uniform heat around the seed trays or the like.

My improved seed sprouter proper comprises a frame having the upright corner members indicated by the reference character 11, and having a series of pans 12 arranged in a vertical spaced tier supported on said frame.

Received in each pan 12 is a seed tray 13 having in its bottom perforations 14. The seed tray 13 is considerably smaller in total outline than the pan 12, as clearly illustrated in the drawings.

Arranged on the interior of each pan 12 on the opposite sides thereof are brackets, each comprising a horizontal member 18 secured to the side wall of the pan 12. Each bracket has at each end of the member 14 an inward extension 15. The extensions 15 have at their inner ends opposite extensions 16, extending along side the side wall of the pan 10, parallel therewith and forming bearings for the spindles on the cranks hereinafter described.

Extending across the bottom of each pan 12 are two rods 17 spaced from each other and having on their ends crank arms 19, provided at their outer ends with the spindles 20 mounted in suitable openings or bearings in the extensions 16.

Formed on the spindle 20 at one end of each rod 17 is an arm 21 extending upwardly beyond the upper edge of the tray 13 and having on its upper end a U-shaped member 22, provided at its outer end with a loop 23. The U-shaped member is designed in one position of the arm 21 to engage and receive the upper edge of the tray 13.

The loops 23 are pivoted to a connecting U-shaped member 24 forming a handle, whereby the arms 21 are held in substantially parallel position.

The parts hereinbefore described are so arranged that in one position of the raising and lowering mechanism, wherein the U-shaped members 22 rest upon the upper edge of the tray 13, the rods 17 rest upon the bottom of the pan, thereby permitting the tray 13 to be in its lowermost position.

Figure 3:
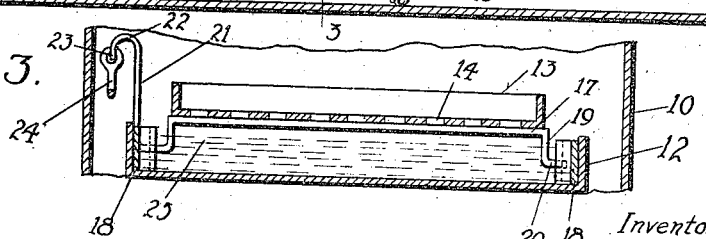
Fig. 3 shows a transverse, vertical, sectional view taken on the line 3—3 of Fig. 1.

When the handle 24 is grasped for throwing over the arms 21 to their positions, shown by dotted lines in Fig. 2, the rod 17 is raised to position, shown in Figs. 2 and 3 for thereby raising the tray 13 to the position shown in said figures.

My improved device is designed to be used for sprouting seeds, and it will readily be seen that seeds may be planted in dirt in the trays 13, and that as much water may be kept in the pans 12 as may be desired.

The trays 13 may be lowered into the water 25 and the pans 12 for causing the seeds to rapidly germinate.

If desired, however, the trays 13 may be readily and easily raised by manipulating the handles 24.

On account of the arrangement and construction of the raising mechanism, it will be seen that the trays 13 are held in horizontal position during their raising and lowering.

The trays and pans are arranged on a frame in a vertical series for saving space and for convenience in handling a plurality of pans. If desired, heat can be supplied to the interior of the member 10.

Some changes may be made in the construction and arrangement of the parts of my improved seed sprouter without departing from the essential features and purposes of my invention, and it is my intention to cover by the patent to be issued upon this application any modified forms of structure or use of mechanical equivalents which may be reasonably included within the scope of my claims.

I claim as my invention.

1. A pan, a perforated tray of smaller size than said pan received in the pan, raising and lowering means comprising rods extending across said pan below said tray, crank devices on said rods, and means for simultaneously operating the crank devices on the rods.

2. A pan, a perforated tray of smaller size than said pan received in the pan, raising and lowering means comprising rods extending across said pan below said tray, crank devices on said rods, means for simultaneously operating the crank devices on the rods, said means comprising parallel arms connected with said crank devices, and a handle device for operatively connecting said parallel arms.

3. In a device of the class described, a pan, brackets, secured to the side of said pan on the interior thereof having spaced bearings, said bearings being spaced from the walls of said pan, a perforated tray received in said pan, a pair of rods extending across said pan below said tray, each rod having a crank at each end, the ends of said crank being rotatably mounted in the respective bearings, arms secured to the outer ends of the cranks at one end of said rod, U-shaped members formed at the outer ends of said arms, and a handle pivoted to said U-shaped members outside said pan, whereby when said handle is swung said arms may be operated for raising and lowering said rods for thereby raising and lowering said tray, and holding it in horizontal position during such raising and lowering movement.

4. In a device of the class described, a frame comprising upright members, a plurality of pans arranged in spaced, vertical succession on said frame, a perforated tray received in each pan, and means adapted to be operated from outside the pans for raising and lowering the respective trays.

5. In a device of the class described, a frame comprising upright members, a plurality of pans arranged in spaced, vertical succession on said frame, a perforated tray received in each pan, means adapted to be operated from outside the pans for raising and lowering the respective trays, and for maintaining said trays in horizontal position during such raising and lowering movement.

Des Moines, Iowa, April 28, 1917.

CARL H. SCHROEDER.

Copies of this patent may be obtained for five cents each, by addressing the "Commissioner of Patents, Washington, D. C."